United States Patent
Okada et al.

(10) Patent No.: US 11,813,692 B2
(45) Date of Patent: Nov. 14, 2023

(54) FRICTION STIR WELDING APPARATUS AND FRICTION STIR WELDING METHOD

(71) Applicant: Kawasaki Jukogyo Kabushiki Kaisha, Kobe (JP)

(72) Inventors: Hideki Okada, Kobe (JP); Yusuke Yoshida, Kobe (JP); Kenichi Kamimuki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 148 days.

(21) Appl. No.: 17/432,570

(22) PCT Filed: Feb. 21, 2020

(86) PCT No.: PCT/JP2020/007050
§ 371 (c)(1),
(2) Date: Aug. 20, 2021

(87) PCT Pub. No.: WO2020/171203
PCT Pub. Date: Aug. 27, 2020

(65) Prior Publication Data
US 2022/0134471 A1    May 5, 2022

(30) Foreign Application Priority Data

Feb. 22, 2019    (JP) .................................. 2019-030173

(51) Int. Cl.
*B23K 20/00*        (2006.01)
*B23K 20/12*        (2006.01)

(52) U.S. Cl.
CPC .............................. *B23K 20/1245* (2013.01)

(58) Field of Classification Search
CPC ............ B23K 20/1255; B23K 20/1265; B23K 20/125; B23K 20/122; B23K 20/12; B23K 20/1225; B23K 20/129; B23K 20/26
See application file for complete search history.

(56) References Cited

U.S. PATENT DOCUMENTS

| 10,105,790 | B2 * | 10/2018 | Kandasamy | ......... B23K 20/129 |
| 10,906,127 | B2 * | 2/2021 | Seo | .................... B23K 20/1265 |
| 11,229,972 | B2 * | 1/2022 | Masaki | .............. B23K 20/2336 |
| 2004/0074949 | A1 * | 4/2004 | Narita | .................. B23K 20/122 228/112.1 |

(Continued)

FOREIGN PATENT DOCUMENTS

JP    2013-166159 A    8/2013

*Primary Examiner* — Erin B Saad
(74) *Attorney, Agent, or Firm* — XSENSUS LLP

(57) ABSTRACT

A friction stir welding apparatus is used at a butted portion where a second workpiece is butted against a first workpiece such that the second workpiece is upright on the first workpiece. The friction stir welding apparatus includes: a rotary tool that is plunged into one inner corner of a pair of inner corners that are positioned, at the butted portion, on both sides of the second workpiece, respectively; an inner corner presser that presses the other inner corner of the pair of inner corners; and a mover that moves the rotary tool and the inner corner presser along a direction in which the butted portion extends. The inner corner presser includes a pressing roller that presses the other inner corner while rolling in a state where the inner corner presser is being moved by the mover.

9 Claims, 10 Drawing Sheets

(56) References Cited

U.S. PATENT DOCUMENTS

2012/0193401 A1* 8/2012 Hori .................. B23K 20/1265
                                                            228/2.1
2016/0263696 A1* 9/2016 Nishida ................ B23K 20/16
2022/0111465 A1* 4/2022 Seo .................... B23K 20/1265

* cited by examiner

FRICTION STIR WELDING APPARATUS AND FRICTION STIR WELDING METHOD

CROSS-REFERENCE TO RELATED APPLICATIONS

This application is based on PCT filing PCT/JP2020/007050, filed Feb. 21, 2020, which claims priority to and the benefit of Japanese Patent Application No. 2019-030173, filed on Feb. 22, 2019, the entire disclosure of each are incorporated herein by reference.

TECHNICAL FIELD

The present disclosure relates to a friction stir welding apparatus and a friction stir welding method that are capable of joining a first workpiece and a second workpiece to form a T-shaped structure in which the second workpiece is butted against the first workpiece such that the second workpiece is upright on the first workpiece.

BACKGROUND ART

Friction stir welding (FSW) is one of the methods for joining workpieces together that are made of a metal or the like. A rotary tool is plunged into a position at which the workpieces are to be joined together, and frictional heat is generated at the position, which causes a plastic flow of the metal or the like, and thereby these workpieces are joined together. There are various types of workpiece joint structures. For example, friction stir welding is used to join one workpiece to another workpiece to form a T-shaped structure (a T-joint) in which the one workpiece is joined to the other workpiece such that the one workpiece is upright on the other workpiece. In the case of joining workpieces together to form such a T-shaped structure, at a butted portion formed by the workpieces butted together, inner corners of the butted portion, the inner corners serving as the "proximal end" portion of the upright workpiece, are subjected to friction stir welding.

As one example of a known joining technique utilizing friction stir welding for forming a T-shaped structure, Patent Literature 1 discloses a friction stir welding apparatus. The friction stir welding apparatus includes: stationary shoulders that come into contact with a pair of inner corners, respectively; a pair of friction stir welding tools that are provided on the respective stationary shoulders, the friction stir welding tools being disposed at both sides of an upright member (upright workpiece) such that the upright member is positioned between the friction stir welding tools and such that the friction stir welding tools are positioned opposite each other; and a moving mechanism that causes the stationary shoulders and the friction stir welding tools to make relative movement along a butted portion. The upright member is positioned between the stationary shoulders, and each stationary shoulder is positioned at the opposite side of the upright member from the friction stir welding tool of the other stationary shoulder. The positions of the stirring axes of the respective friction stir welding tools are deviated from each other in the relative movement direction.

CITATION LIST

Patent Literature

PTL 1: Japanese Laid-Open Patent Application Publication No. 2013-166159

SUMMARY

A friction stir welding apparatus according to the present disclosure is a friction stir welding apparatus for use in friction stir welding performed on a butted portion where a second workpiece is butted against a first workpiece such that the second workpiece is upright on the first workpiece. The friction stir welding apparatus includes: a rotary tool that is plunged into one inner corner of a pair of inner corners that are positioned, at the butted portion, on both sides of the second workpiece, respectively; an inner corner presser that presses the other inner corner of the pair of inner corners; and a mover that moves the rotary tool and the inner corner presser along a direction in which the butted portion extends. The inner corner presser includes a pressing roller that presses the other inner corner while rolling in a state where the inner corner presser is being moved by the mover.

According to the above configuration, the rotary tool is plunged into one of the inner corners of the butted portion where the first workpiece and the second workpiece are butted together, and the rotary tool is moved along the butted portion to perform friction stir welding on the butted portion. At the time, the pressing roller presses the other inner corner while rolling.

In addition, according to the above configuration, one of the pair of inner corners is friction-stir-welded by one rotary tool, and the other inner corner is pressed by the pressing roller.

A friction stir welding method according to the present disclosure is a friction stir welding method for use in friction stir welding performed on a butted portion where a second workpiece is butted against a first workpiece such that the second workpiece is upright on the first workpiece. The friction stir welding method includes: plunging a rotary tool into one inner corner of a pair of inner corners that are positioned, at the butted portion, on both sides of the second workpiece, respectively, and moving the rotary tool along a direction in which the butted portion extends; and moving the rotary tool and an inner corner presser along the direction in which the butted portion extends, while pressing the other inner corner of the pair of inner corners by the inner corner presser. Pressing the other inner corner by the inner corner presser includes using a pressing roller as a pressing parts of the inner corner presser, the pressing parts pressing the other inner corner. The pressing roller presses the other inner corner while rolling in a state where the inner corner presser is being moved.

The above and other objectives, features, and advantages of the present disclosure will more fully be apparent from the following detailed description of preferred embodiments with accompanying drawings.

DESCRIPTION OF EMBODIMENTS

Figure 1:
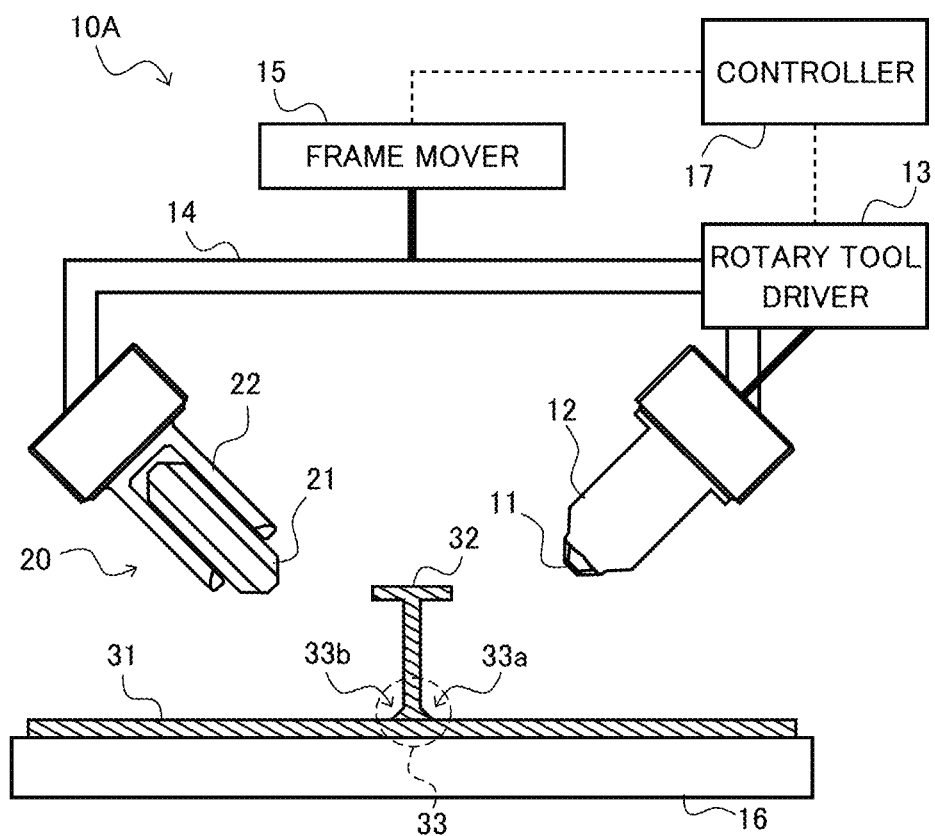
FIG. 1 is a schematic diagram showing a configuration example of a friction stir welding apparatus according to an exemplary embodiment 1 of the present disclosure.

Hereinafter, representative embodiments of the present disclosure are described with reference to the drawings. In the drawings, the same or corresponding elements are denoted by the same reference signs, and repeating the same descriptions is avoided below.

First, an exemplary embodiment of the configuration of a friction stir welding apparatus according to the present disclosure is specifically described with reference to FIG. 1 to FIG. 4B.

[Configuration of Friction Stir Welding Apparatus]

As shown in FIG. 1, a friction stir welding apparatus 10A according to an exemplary embodiment 1 is a friction stir welding apparatus for use in friction stir welding performed on a butted portion 33 where a second workpiece 32 is butted against a first workpiece 31, such that the second workpiece 32 is upright on the first workpiece 31. The friction stir welding apparatus 10A includes a rotary tool 11, a stationary shoulder 12, a rotary tool driver 13, an inner corner presser 20, a frame 14, a frame mover 15, backing 16, and a controller 17.

Figure 2A:
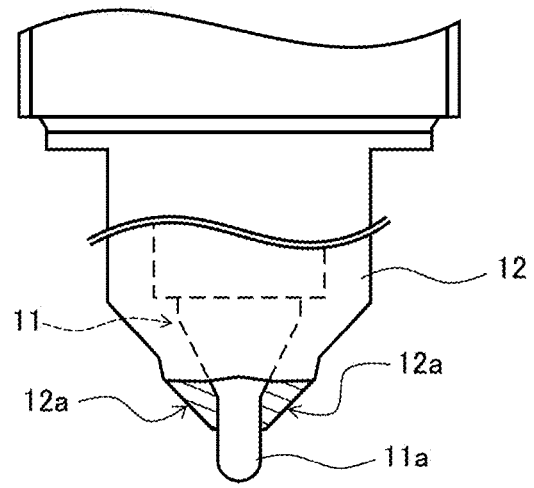
FIG. 2A is a schematic diagram showing a configuration example of a rotary tool included in the friction stir apparatus of FIG. 1.

As shown in FIG. 2A, the rotary tool 11 includes a stirring pin 11a at its distal end. The rotary tool driver 13 causes the rotary tool 11 to advance and retract, and drives the stirring pin 11a to rotate. The stirring pin 11a of the rotary tool 11 is, while rotating, plunged into to-be-joined portions of the respective workpieces to friction-stir the to-be-joined portions, and thereby the workpieces are joined together. As shown in FIG. 2A, the stationary shoulder 12 is positioned at the outer periphery of the rotary tool 11, and in a state where the rotary tool 11 is plunged into the workpieces, the stationary shoulder 12 is in contact with the surfaces of the workpieces. The stationary shoulder 12 includes an inclined shoulder surface 12a, which is formed around the rotation pin 11a.

In the present disclosure, for example, the second workpiece 32 is upright on the front surface of the first workpiece 31, which is disposed horizontally. The butted portion 33, at which these workpieces 31 and 32 are butted together, is subjected to friction stir welding by the rotary tool 11. At the butted portion 33, inner corners 33a and 33b are positioned on both sides of the second workpiece 32, respectively. The rotary tool 11 is plunged into one of the pair of inner corners 33a and 33b to perform friction stir welding thereon. The inner corner presser 20 presses the other one of the pair of inner corners 33a and 33b, i.e., the inner corner that is not being friction-stirred by the rotary tool 11.

Hereinafter, for the sake of convenience of the description, one inner corner 33a shown on the right side in FIG. 1 is referred to as a first inner corner 33a, and the other inner corner 33b shown on the left side in FIG. 1 is referred to as a second inner corner 33b. In the example shown in FIG. 1, between the pair of inner corners 33a and 33b, the first inner corner 33a is the inner corner that is friction-stirred by the rotary tool 11 (i.e., joined-side inner corner), and the second inner corner 33b is the inner corner that is pressed by the inner corner presser 20 (i.e., pressed-side inner corner). However, which one of the inner corners 33a and 33b is the joined-side inner corner or the pressed-side inner corner is determined relatively. At the end, both the first inner corner 33a and the second inner corner 33b are friction-stirred, which will be described below.

Figure 2B:
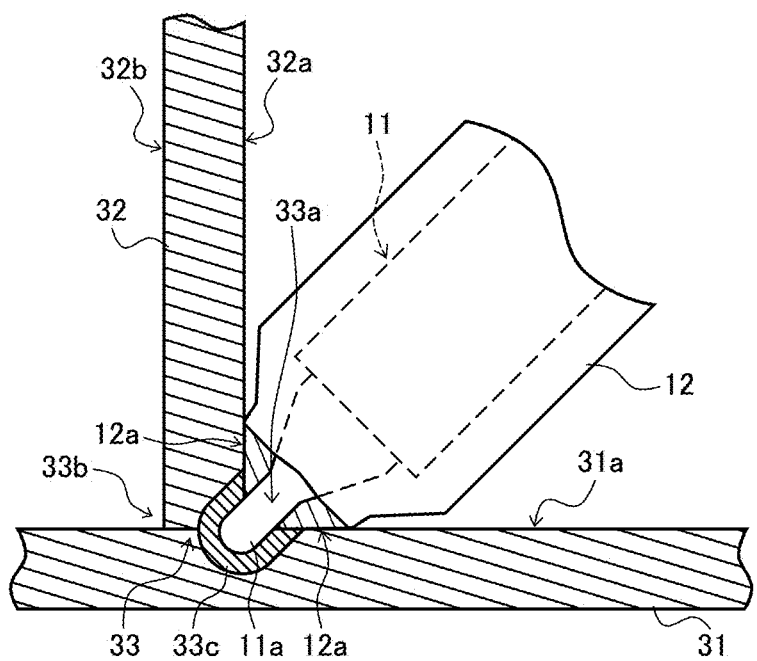
FIG. 2B is a schematic diagram showing one example of a state where the rotary tool of FIG. 2A is in contact with an inner corner of a butted portion.

As shown in FIG. 2B, the front surface of the first workpiece 31 is a reference surface 31a, and both surfaces of the upright second workpiece 32 are upright surfaces 32a and 32b, each of which is upright on the reference surface 31a. One of the upright surfaces 32a and 32b positioned on the first inner corner 33a side is a first upright surface 32a, and the other upright surface on the second inner corner 33b side is a second upright surface 32b. FIG. 2B shows the first inner corner 33a being friction-stirred by the rotary tool 11. In FIG. 2B, the inclined shoulder surface 12a of the stationary shoulder 12 is in contact with the reference surface 31a of the first workpiece 31 and the upright surface 32a of the second workpiece 32.

In the example shown in FIG. 2B, the stirring pin 11a of the rotary tool 11 is plunged into the first inner corner 33a, and friction-stirs the first workpiece 31 and the second workpiece 32. As a result, the material of the first workpiece 31 on the reference surface 31a side, and the material of the second workpiece 32 on the upright surface 32a side, are friction-stirred, and a plastic flow 33c occurs. In the example shown in FIG. 2B, the inclined shoulder surface 12a of the stationary shoulder 12 is in contact with the friction-stirred inner surfaces of one of the pair of inner corners 33a and 33b.

As described below, the rotary tool 11 friction-stirs the first inner corner 33a while moving along the direction in which the first inner corner 33a extends. At the time, of the second inner corner 33b, which is positioned on the opposite side of the second workpiece 32 from the first inner corner 33a, a portion corresponding to, i.e., opposite to, the currently friction-stirred portion of the first inner corner 33a (hereinafter, "opposite portion") is also softened due to the friction stirring. Here, the opposite portion or the vicinity thereof is pressed by the inner corner presser 20. At the first inner corner 33a, a portion that surrounds the currently friction-stirred portion into which the rotary tool 11 is being plunged (hereinafter, "surrounding portion") is also softened. The surrounding portion is pressed by the stationary shoulder 12.

In an exemplary embodiment 1, the rotary tool 11 and the inner corner presser 20 are fixed to, for example, the frame 14. The frame 14 is moved by the frame mover 15 in the direction in which the butted portion 33 extends. In FIG. 1, the frame 14 is moved along a direction perpendicular to the plane of FIG. 1. Therefore, the rotary tool 11, the stationary shoulder 12, and the inner corner presser 20, which are fixed to the frame 14, are also moved by the frame mover 15 in the direction in which the butted portion 33 extends.

Accordingly, the rotary tool 11 performs friction stir welding on the first inner corner 33a while moving in the direction in which the first inner corner 33a extends. Also, the inner corner presser 20 presses the second inner corner 33b while moving in the direction in which the second inner corner 33b extends. In a case where the rotary tool 11 performs friction stir welding on the second inner corner 33b while moving in the direction in which the second inner corner 33b extends, the inner corner presser 20 presses the first inner corner 33a while moving in the direction in which the first inner corner 33a extends.

In a case where the surface of the first workpiece 31 against which the second workpiece 32 is butted is defined as "front surface" and the opposite surface of the first workpiece 31 is defined as "back surface," the backing 16 supports the back surface of the first workpiece 31 between the workpieces 31 and 32. As described below, in some cases, the front surface of the first workpiece 31 is referred to as "reference surface" for the sake of convenience of the description. The controller 17 controls the operations of the entire friction stir welding apparatus 10A including the rotary tool driver 13, the frame mover 15, etc.

A specific configuration of the friction stir welding apparatus 10A, i.e., specific configurations of the rotary tool 11, the stationary shoulder 12, the rotary tool driver 13, the frame 14, the frame mover 15, the backing 16, the controller 17, etc., are not particularly limited. Known configurations in the field of friction stir welding are suitably applicable.

Specific configurations of the workpieces 31 and 32 are also not particularly limited. In the example shown in FIG. 1, the first workpiece 31 is flat plate-shaped. Although the second workpiece 32 is also flat plate-shaped, one side edge thereof (the upper side edge in FIG. 1) is T-shaped, and the other side edge, i.e., the side edge butted against the first workpiece 31, includes a pre-formed fillet 34. However, this is merely a non-limiting example. For example, the T-shaped structure (T-joint) or the fillet 34 may be eliminated from the side edges of the second workpiece 32, and the second workpiece 32 may be flat plate-shaped in a manner similar to the first workpiece 31. Alternatively, both the workpieces 31 and 32 may be curved.

The material of each of the workpieces 31 and 32 is not particularly limited. Typically, each of the workpieces 31 and 32 may be made of a known metal material. The metal is not particularly limited a specific kind, but may be aluminum, copper, titanium, magnesium, or an alloy of any of these metals. Each of the workpieces 31 and 32 may be made of not a metal material, but any other known material that can be friction-stir-welded.

As previously described, the inner corner presser 20 presses one of the pair of inner corners 33a and 33b that is not friction-stirred (in the example shown in FIG. 1, the second inner corner 33b). In the present disclosure, the inner corner presser 20 includes a pressing roller 21 as a pressing parts that presses the inner corner that is not friction-stirred. In a state where the inner corner presser 20 is moving in the direction in which the butted portion 33 extends, the pressing roller 21 presses the inner corner while rolling. The pressing roller 21 is rollably supported by a roller support 22.

Figure 3A:
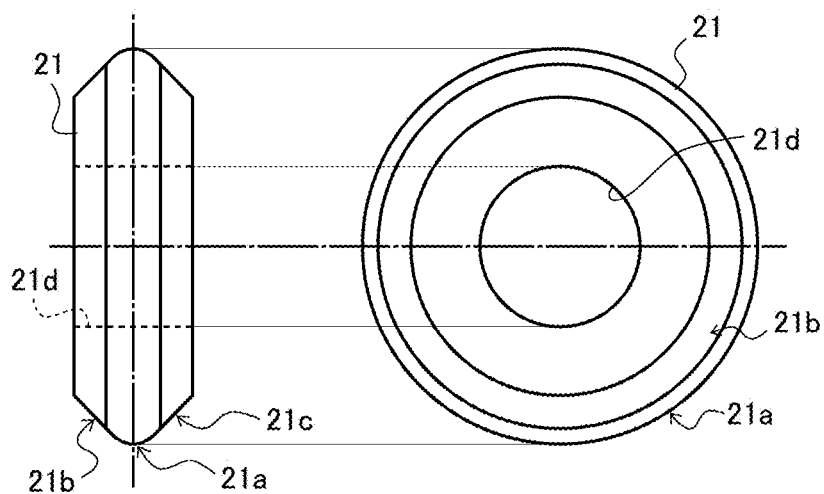
FIG. 3A is a comparative illustration of a side view and a plan view, showing a configuration example of a pressing roller of an inner corner presser included in the friction stir welding apparatus of FIG. 1.

A specific configuration of the pressing roller 21 is not particularly limited, so long as at least the pressing roller 21 can, while rolling, press, with its outer circumferential surface, the inner corner that is not friction-stirred. In an exemplary embodiment 1, as shown in FIG. 3A, the outer circumferential shape of the pressing roller 21 is such that the middle portion protrudes from the peripheral edge portions. In a case where the outer circumferential surface of the pressing roller 21 is defined as a tread 21a, the pressing roller 21 includes a pair of inclined surfaces 21b and 21c on both sides of the tread 21a, and each of the inclined surfaces 21b and 21c extends from the tread 21a toward the inner circumferential side of the pressing roller 21. Since the pressing roller 21 includes these inclined surfaces 21b and 21c, the outer circumferential side of the pressing roller 21 has a three-dimensional shape corresponding to the shape of each of the inner corners 33a and 33b.

Figure 3B:
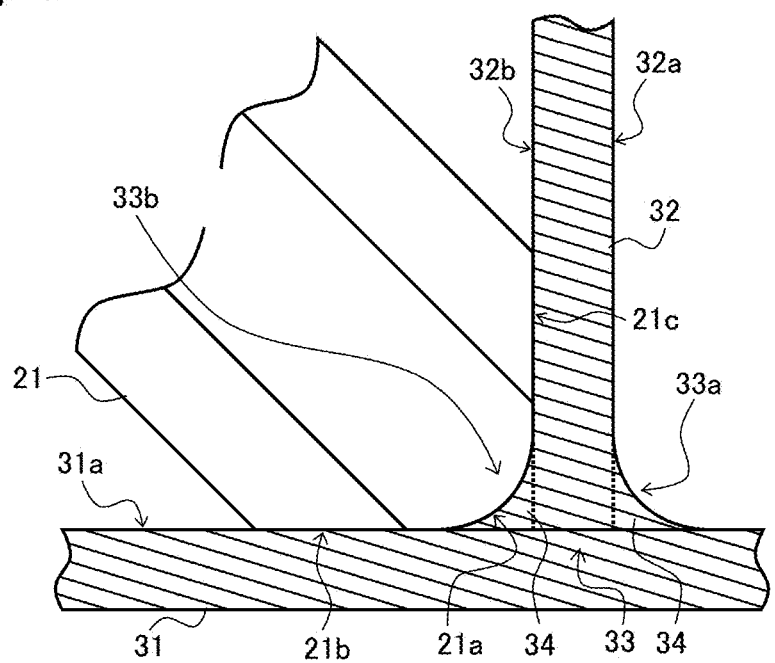
FIG. 3B is a schematic diagram showing one example of a state where the pressing roller of FIG. 3A is in contact with an inner corner of the butted portion.

For the sake of convenience of the description, one of the inclined surfaces 21b and 21c is defined as a first inclined surface 21b, and the other is defined as a second inclined surface 21c. As shown in FIG. 3B, the fillet 34 is formed on a side edge of the second workpiece 32, the side edge being butted against the first workpiece 31.

As shown in FIG. 3B, in a state where the pressing roller 21 is in contact with the second inner corner 33b, the tread 21a is in contact with the fillet 34 of the second inner corner 33b; the first inclined surface 21b is in contact with the reference surface 31a of the first workpiece 31; and the second inclined surface 21c is in contact with the second upright surface 32b of the second workpiece 32.

Therefore, the inclination angle of each of the pair of inclined surfaces 21b and 21c may be set such that the inclined surface 21b and the inclined surface 21c come into contact with the reference surface 31a and the second upright surface 32b (or the first upright surface 32a) connected to the reference surface 31a, respectively. As one representative example, the second workpiece 32 is upright on and perpendicular to the reference surface 31a of the first workpiece 31. In this case, the inclination angle of each of the inclined surfaces 21b and 21c may be 45° with reference to the width direction of the pressing roller 21. Accordingly, an angle formed by the first inclined surface 21b and the second inclined surface 21c is 90°.

As described above, preferably, the outer circumferential portion of the pressing roller 21 of an exemplary embodiment 1 has a protruding three-dimensional shape corresponding to the recessed three-dimensional shape of the inner corner 33b. However, a specific shape of the pressing roller 21 is not limited to this example, so long as the pressing roller 21 has such a shape that the pressing roller 21 can press the inner corner that is not friction-stirred as described above. To be more specific, for example, the inclined surfaces 21b and 21c need not be formed, so long as the pressing roller 21 has such a shape that in a state where the pressing roller 21 is in contact with the second inner corner 33b (or the first inner corner 33a), the tread 21a is in contact with the fillet 34.

Preferably, the inclination angle of each of the inclined surfaces 21b and 21c is set to such an angle that, as previously described, in a state where the tread 21a is in contact with the fillet 34, the inclined surface 21b and the inclined surface 21c are in contact with the reference surface 31a and the second upright surface 32b (or the first upright surface 32a), respectively. However, this is merely a non-limiting example. For example, the inclination angle of each of the inclined surfaces 21b and 21c may be set such that in a state where the tread 21a is in contact with the fillet 34, only one of the surfaces (only the reference surface 31a, or only the second upright surface 32b or the first upright surface 32a) is contacted by one of the inclined surfaces. Alternatively, the inclination angle of each of the inclined surfaces 21b and 21c may be set such that the angle formed by the inclined surfaces 21b and 21c is slightly less than the angle formed by the reference surface 31a and the second upright surface 32b (or the first upright surface 32a).

In the example shown in FIG. 3B, as previously described, since the fillet 34 is formed on the side edge of the second workpiece 32, the tread 21a of the pressing roller 21 comes into contact with the fillet 34. However, the fillet 34 need not be formed on the side edge of the second workpiece 32. In a case where the fillet 34 is not formed on the side edge of the second workpiece 32, in a state where the pressing roller 21 is in contact with the second inner corner 33b, a space corresponding to the fillet 34 is present between the tread 21a and the second inner corner 33b (or the first inner corner 33a). Accordingly, a material corresponding to the volume of the space may be added externally, or may be applied to the second workpiece 32 in advance. As described below, when the first inner corner 33a is friction-stirred by the rotary tool 11, the butted portion 33 is also softened. Accordingly, the material of the butted portion 33, due to a plastic flow, flows into the space corresponding to the fillet 34. Consequently, the fillet 34 can be formed on the second inner corner 33b.

In an exemplary embodiment 1, similar to the outer circumferential portion of the pressing roller 21, the shape of the stationary shoulder 12 may have inclined surfaces that come into contact with, at the first inner corner 33a, the reference surface 31a and the first upright surface 32a of the second workpiece 32. For example, in FIG. 1, the distal end portion of the stationary shoulder 12 is provided with the rotary tool 11, such that the rotary tool 11 is advanceable and retractable. The distal end portion is provided with a pair of inclined surfaces that are continuous with the rotary tool 11.

As shown in FIG. 3A, a bearing hole 21d is formed in the center portion of the pressing roller 21. The bearing hole 21d is a hole that allows the pressing roller 21 to be rollably supported by the roller support 22. A fixed shaft included in the roller support 22 is inserted in the bearing hole 21d. Accordingly, the pressing roller 21 rolls about the fixed shaft of the roller support 22.

Figure 4A:
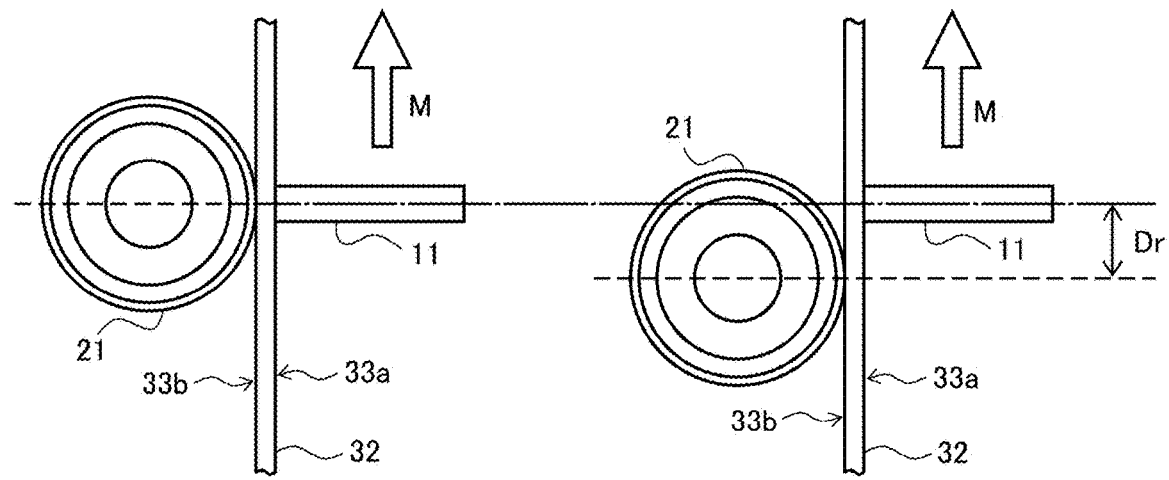
FIG. 4A and FIG. 4B are schematic diagrams illustrating positional relationships in a state where the rotary tool is plunged into one inner corner, and the pressing roller is pressed against the other inner corner.

As shown in the drawing on the left side of FIG. 4A, preferably, the pressing position of the pressing roller 21 coincides with the plunging position of the rotary tool 11. Specifically, the position pressed by the pressing roller 21 at the second inner corner 33b, and the plunging position of the rotary tool 11 at the first inner corner 33a, may substantially coincide with positions that are located opposite each other with the second workpiece 32 interposed therebetween. This makes it possible to suitably press, with the pressing roller 21, the material that has been softened by the rotary tool 11.

However, the pressing position of the pressing roller 21 need not coincide with the plunging position of the rotary tool 11. For example, as shown in the drawing on the right side of FIG. 4A, the pressing position of the pressing roller 21 may be, as seen from the plunging position of the rotary tool 11, deviated backward in a moving direction M (as indicated by Dr in the drawing). Alternatively, as shown in FIG. 4B, the pressing position of the pressing roller 21 may be deviated slightly forward in the moving direction M (as indicated by Df in the drawing).

The pressing roller 21 presses the material that has been softened due to the friction stirring by the rotary tool 11. Therefore, the softening of the material is less likely to occur at the forward side in the moving direction M although it depends on various conditions. In this respect, since the softened material is not immediately solidified, it is considered that the softened state of the material continues for a short period of time at the backward side in the moving direction M. Therefore, even though the pressing roller 21 performs the pressing at a position that is deviated backward in the moving direction M, the pressing can still be performed properly while suppressing deformations such as galling.

As shown in FIG. 1, each of the rotary tool 11 and the pressing roller 21 comes into contact with (i.e., is plunged into or pressed against) the inner corner 33a or 33b from an inclined direction. However, for the sake of convenience of the description of the plunging position and the pressing position, FIG. 4A and FIG. 4B are schematically illustrated as if the pressing roller 21 and the rotary tool 11 are substantially perpendicularly in contact with the upright second workpiece 32.

Figure 4B:
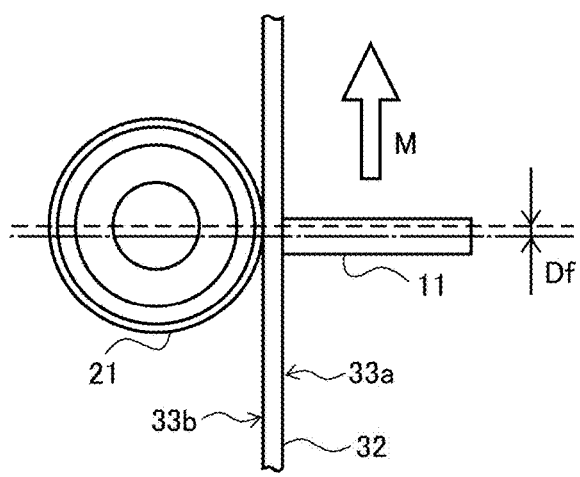

In each of FIG. 4A and FIG. 4B, the rotational axis of the rotary tool 11 is indicated by a one-dot chain line, and the rotational axis serves as a reference for the plunging position. The pressing position of the pressing roller 21 is indicated by a dashed line. In FIG. 4A, the plunging position, i.e., the position of the rotational axis of the rotary tool 11, is the same in both the left-side and right-side drawings, but the pressing position of the pressing roller 21 is different between the left-side and right-side drawings. Also, the moving direction of the rotary tool 11 and the pressing roller 21 (i.e., a direction along the direction in which the butted portion 33 extends) is indicated by a block arrow M.

The range of deviation of the pressing position from the plunging position is not particularly limited, but may be suitably set in accordance with specific configurations of the workpieces 31 and 32 forming the butted portion 33, the rotary tool 11, the stationary shoulder 12, and the pressing roller 21 as well as various conditions thereof such as moving speeds or pressing forces. As one representative example, the backward deviation Dr in FIG. 4A may be less than 10 mm, and the forward deviation Df in FIG. 4B may be less than 1 mm. The plunging position of the rotary tool 11, i.e., the position of the rotational axis, is defined as a reference position of 0 mm. A position deviated from the reference position in the moving direction M (i.e., a position forward of the reference position in the moving direction M) is defined as a positive position, and a position deviated from the reference position in the direction opposite to the moving direction M (i.e., a position backward of the reference position in the moving direction M) is defined as a negative position. In this case, the pressing position of the pressing roller 21 may be within a range that is less than +1 mm and greater than −10 mm.

[Friction Stir Welding Method]

Next, one representative example of a friction stir welding method according to the present disclosure using the friction stir welding apparatus 10A configured as described above is specifically described with reference to FIG. 5A to FIG. 8.

Figure 5A:
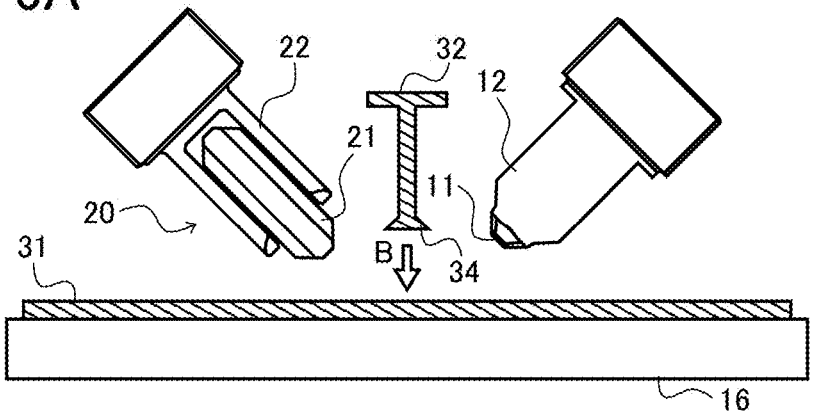
FIG. 5A to FIG. 5C are process drawings schematically showing one representative example of processes in a method of manufacturing a T-shaped construction by performing friction stir welding on the butted portion by the friction stir welding apparatus of FIG. 1.

As shown in FIG. 5A, first, the flat plate-shaped first workpiece 31 is placed on a supporting surface of the backing 16, and the second workpiece 32 is butted against the front surface of the first workpiece 31 (the reference surface 31a in FIG. 3B) such that the second workpiece 32 is upright on the front surface of the first workpiece 31 (see a block arrow B in FIG. 5A). The rotary tool 11 and the stationary shoulder 12 are caused to face the first inner corner 33a, and the inner corner presser 20 is caused to face the second inner corner 33b.

In the example shown in FIG. 5A, a side edge of the second workpiece 32, the side edge being butted against the first workpiece 31 (i.e., the lower side edge in the drawing), includes the pre-formed fillet 34. A method of forming the fillet 34 is not particularly limited. For example, the fillet 34 may be molded by using a known forming mold. A peripheral edge (the upper edge in the drawing) of the second workpiece 32, the peripheral edge being positioned on the opposite side of the second workpiece 32 from the aforementioned butted side edge, includes a pre-formed T-shaped structure. However, as mentioned above, this is merely a non-limiting example.

Figure 5B:
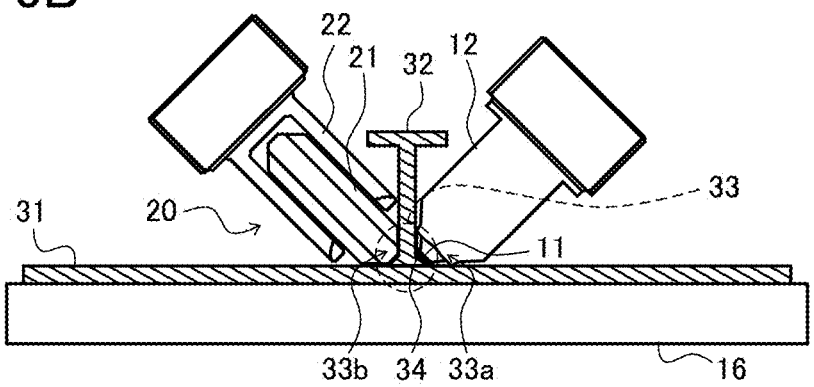

Next, as shown in FIG. 5B, the rotary tool 11 and the stationary shoulder 12 are brought into contact with the first inner corner 33a, which is one of the pair of inner corners 33a and 33b of the butted portion 33 formed by the first workpiece 31 and the second workpiece 32, and the pressing roller 21 of the inner corner presser 20 is brought into contact with the other second inner corner 33b. At the time, as shown in FIG. 3B, the tread 21a of the pressing roller 21 comes into contact with the surface of the fillet 34; the first inclined surface 21b of the pressing roller 21 comes into contact with the reference surface 31a of the first workpiece 31; and the second inclined surface 21c of the pressing roller 21 comes into contact with the second upright surface 32b of the second workpiece 32.

Thereafter, the rotary tool 11 is, while rotating, plunged into the first inner corner 33a, and as a result, the material of the first inner corner 33a and the material of the vicinity thereof are friction-stir-welded. At the time, at the first inner corner 33a, the stationary shoulder 12 is in contact with the reference surface 31a of the first workpiece 31 and the first upright surface 32a of the second workpiece 32, the reference surface 31a and the first upright surface 32a forming the first inner corner 33a. Therefore, the material softened at the first inner corner 33a is supported by the stationary shoulder 12. Accordingly, at the first inner corner 33a, the second workpiece 32 is joined to the first workpiece 31 in a state where the shape of the fillet 34 is maintained.

In a state where the first inner corner 33a is being friction-stirred, although the second inner corner 33b is not being friction-stirred, the material of the second inner corner 33b may become softened. Therefore, in a case where a conventional movable presser that is pressing the second inner corner 33b is moved in the direction in which the second inner corner 33b extends, the softened material tends to adhere to the pressing surface of the conventional presser. Consequently, deformations such as galling, tears, burrs, etc., occur at the second inner corner 33b.

In this respect, in the present disclosure, as previously described, the pressing roller 21 included in the inner corner presser 20 is in contact with (i.e., presses) the second inner corner 33b. Accordingly, the pressing roller 21 presses the second inner corner 33b while rolling. Therefore, even though the material in the vicinity of the second inner corner 33b is softened, adhesion of the material to, for example, the tread 21a of the pressing roller 21 is effectively suppressed or avoided. Consequently, the occurrence of deformations such as galling on the surface of the second inner corner 33b is also effectively suppressed or avoided, and thereby the shape of the fillet 34 is maintained.

Figure 5C:
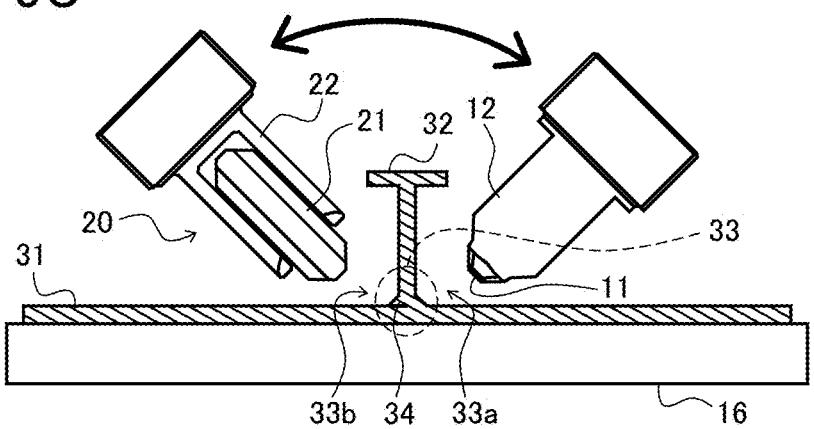
Figure 6A:
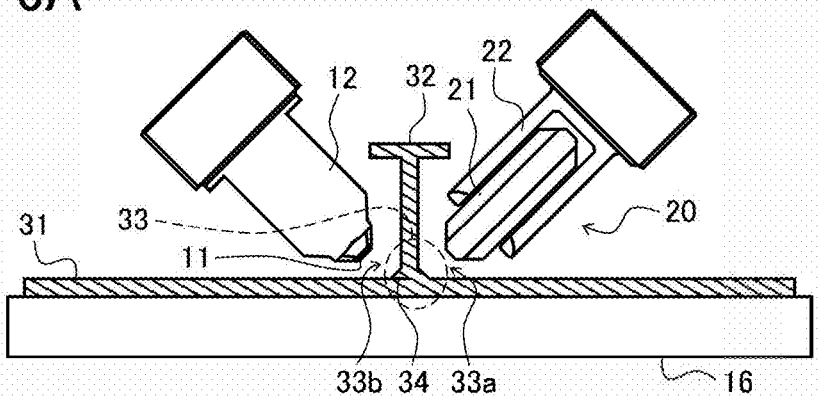
FIG. 6A to FIG. 6C are process drawings schematically showing processes that follow the T-shaped construction manufacturing processes shown in FIG. 5A to FIG. 5C.

Thereafter, in a state where the friction stir welding on the entire first inner corner 33a is completed, as shown in FIG. 5C, the material of the second workpiece 32 at the first inner corner 33a of the butted portion 33 has been joined to the front surface of the first workpiece 31; meanwhile, at the second inner corner 33a, the fillet 34 of the second workpiece 32 is not yet joined to, but in contact with, the front surface of the first workpiece 31. Therefore, as shown in FIG. 6A, the position of the rotary tool 11 (and the stationary shoulder 12) and the position of the inner corner presser 20 are switched with each other. The rotary tool 11 and the stationary shoulder 12 are caused to face the second inner corner 33b, and the inner corner presser 20 is caused to face the first inner corner 33a.

Figure 6B:
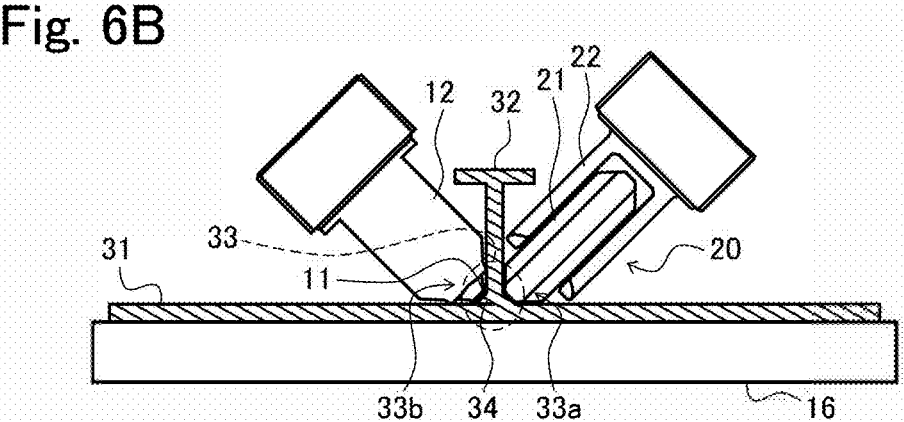

Next, as shown in FIG. 6B, the rotary tool 11 and the stationary shoulder 12 are brought into contact with the second inner corner 33b, and the pressing roller 21 of the inner corner presser 20 is brought into contact with the first inner corner 33a. Thereafter, the rotary tool 11 is, while rotating, plunged into the second inner corner 33b, and as a result, the material of the second inner corner 33b and the material of the vicinity thereof are friction-stir-welded. The material softened at the second inner corner 33b is supported by the stationary shoulder 12. Accordingly, also at the second inner corner 33b, the shape of the fillet 34 is maintained.

In a state where the second inner corner 33b is being friction-stirred, the material of the previously joined first inner corner 33a may become softened again. The pressing roller 21 included in the inner corner presser 20 presses the first inner corner 33a while rolling. Therefore, even though the material in the vicinity of the first inner corner 33a is softened, adhesion of the material to, for example, the tread 21a of the pressing roller 21 is effectively suppressed or avoided. Consequently, the occurrence of deformations such as galling on the surface of the first inner corner 33a is also effectively suppressed or avoided.

Figure 6C:
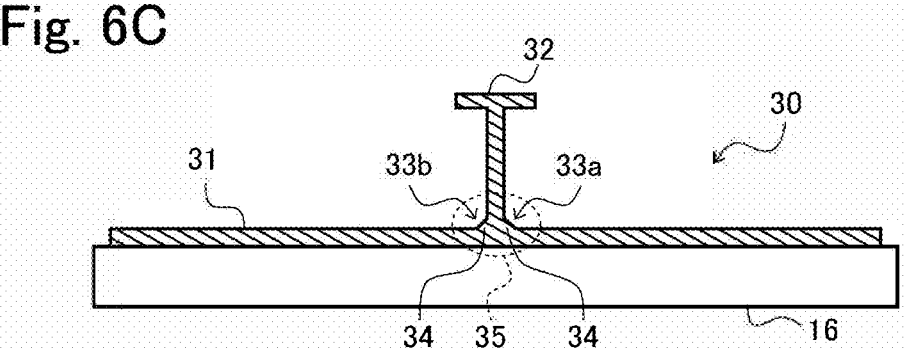

As a result, as shown in FIG. 6C, at the entire butted portion 33, the first workpiece 31 and the second workpiece 32 butted together are joined together, forming a butt joint 35. In this manner, a T-shaped construction 30 is manufactured. In this state, at each of the first inner corner 33a and the second inner corner 33b, the joining has been done while maintaining the shape of the fillet 34, and there is substantially no deformation, such as galling, on the surface of the fillet 34.

In a case where a side edge of the second workpiece 32, the side edge being butted against the first workpiece 31, does not include the pre-formed fillet 34, for example, a linear object may be used, with which to supplement a material that corresponds to the fillet 34. The linear object corresponds to the aforementioned material corresponding to the volume of the space, the material being added externally. A specific configuration of the linear object is not particularly limited, so long as the linear object is made of the same material as, or a similar material to, the material of the workpieces 31 and 32 (or made of a material that can be friction-stirred with the workpieces 31 and 32) and the linear object is in such a shape that can be disposed at each of the inner corners 33a and 33b along the direction in which the butted portion 33 extends.

Figure 7A:
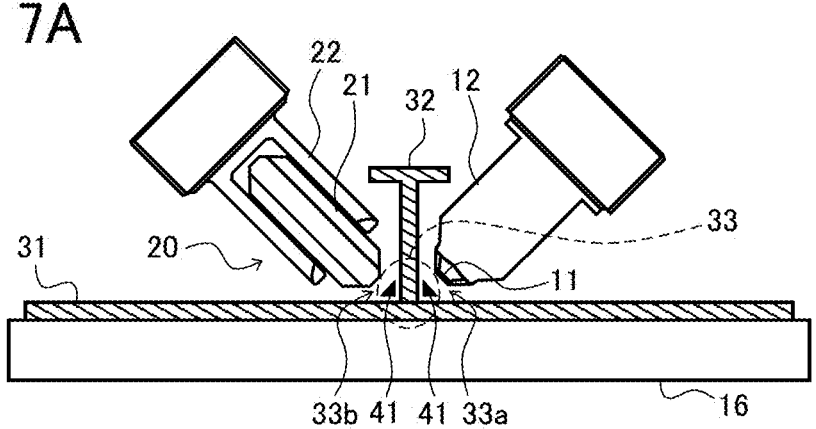
FIG. 7A to FIG. 7C are schematic diagrams showing configuration examples in cases where a linear object or linear objects is/are used in the T-shaped construction manufacturing method shown in FIG. 5A to FIG. 5C and FIG. 6A to FIG. 6C.

For example, as shown in FIG. 7A, a linear object 41 may be disposed on each of the inner corners 33a and 33b along the butted portion 33, and the second workpiece 32 and the first workpiece 31 may be friction-stirred together with the linear objects 41. In the example shown in FIG. 7A, each linear object 41 may have a substantially right-angled triangular cross-sectional shape that is the same as the cross-sectional shape of the fillet 34. Each linear object 41 may be disposed such that the right-angled portion is in contact with the inner corner 33a or 33b, and such that the hypotenuse portion faces the rotary tool 11 or the inner corner presser 20.

Figure 7B:
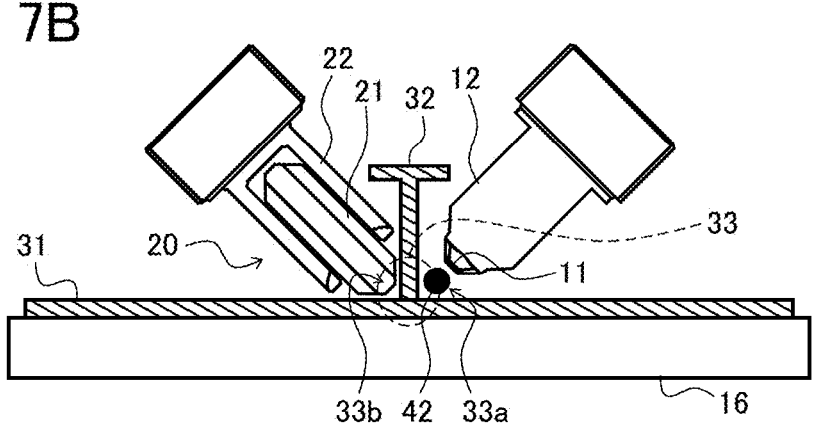

Alternatively, as shown in FIG. 7B, a linear object 42 need not be disposed on each of the inner corners 33a and 33b, but may be disposed on only one of the inner corners 33a and 33b. In the example shown in FIG. 7B, the linear object 42 has a substantially circular cross-sectional shape, and is thicker (i.e., greater in terms of line width) than each linear object 41 shown in FIG. 7A. The weight of the linear object 42 may be substantially the same as the weight of the two linear objects 41.

In a case where the second workpiece 32 and the first workpiece 31 are friction-stirred together with the linear object 42, at the first inner corner 33a, not only are the second workpiece 32 and the first workpiece 31 joined together by the friction stirring, but the fillet 34 is also formed. The material that has been softened by the friction stirring flows toward the second inner corner 33b due to a plastic flow. At the time, since a space corresponding to the fillet 34 is present between the second inner corner 33b and the pressing roller 21, the fillet 34 is formed also at the second inner corner 33b.

In a state where the entire joining at the first inner corner 33a is completed, the fillet 34 has been formed at the second inner corner 33b, but the second workpiece 32 and the first workpiece 31 are not yet joined together at the second inner corner 33b. Therefore, as previously described, the position of the rotary tool 11 and the position of the inner corner presser 20 may be switched with each other, and the second inner corner 33b may be friction-stirred by the rotary tool 11. Consequently, also at the second inner corner 33b, the second workpiece 32 and the first workpiece 31 are joined together, and the occurrence of deformations, such as galling, on the surface of the fillet 34 is suppressed. In this manner, a high-quality T-shaped construction 30 is manufactured.

Figure 7C:
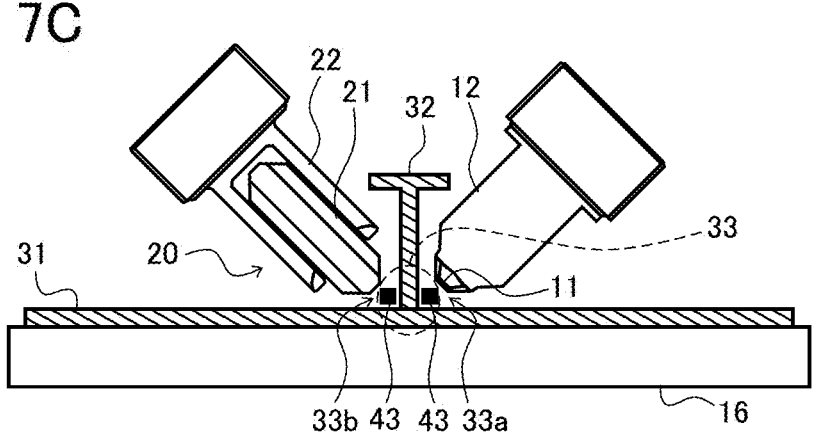

A specific cross-sectional shape of the linear object is not limited to, for example, a triangular or circular shape. For example, as shown in FIG. 7C, the linear object may be a linear object 43 having a rectangular (substantially square) cross-sectional shape, or may have a different cross-sectional shape. In the configuration shown in FIG. 7B, the linear object 42, which is added to only one of the inner corners 33a and 33b, has a substantially circular cross-sectional shape. However, the cross-sectional shape of such a linear object, whose weight is the same as the weight of two linear objects, is not particularly limited, and may be a different shape such as a rectangular shape.

Figure 10A:
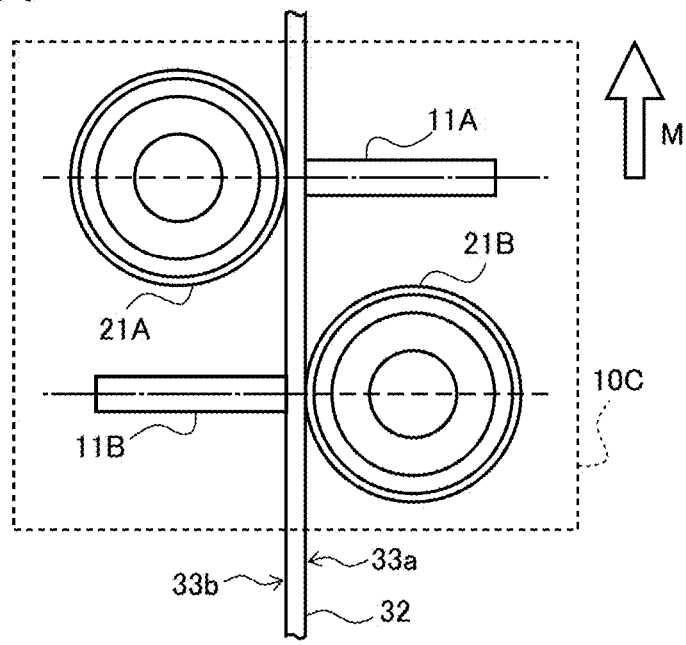
FIG. 10A and FIG. 10B are schematic diagrams showing a configuration example of a friction stir welding apparatus according to the other exemplary embodiment 3 of the present disclosure.
Figure 10B:
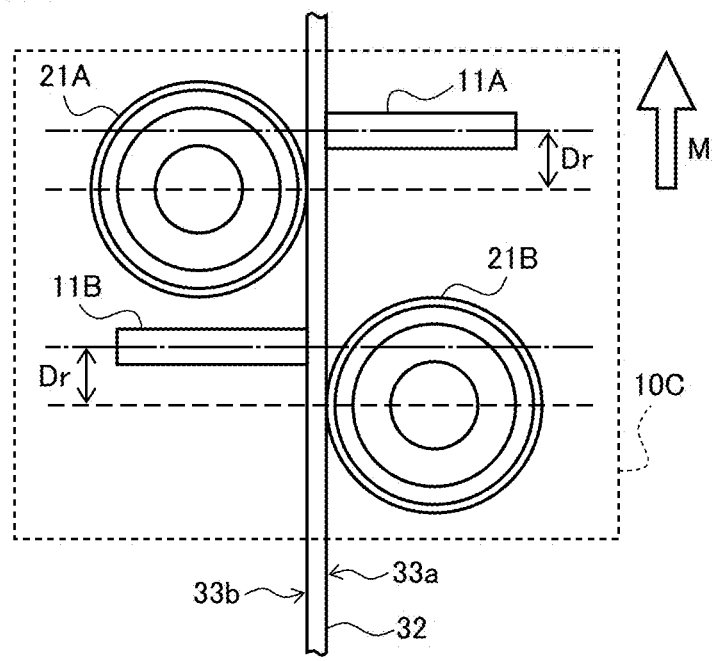

The technique shown in FIG. 7A or FIG. 7C, i.e., the technique in which the linear object 41 or the linear object 43 is disposed on each of the inner corners 33a and 33b and the friction stir welding is performed thereon, is suitably applicable to a case where the friction stir welding is performed on the inner corners 33a and 33b concurrently (see FIG. 10A and FIG. 10B). This case will be described below in the other exemplary embodiment 3. Also in this case, the cross-sectional shape of each of the linear objects 41 and 43 is not particularly limited.

[Variations]

In the friction stir welding apparatus 10A according to an exemplary embodiment 1, as shown in FIG. 1, the stationary shoulder 12 is provided with the rotary tool 11 such that the rotary tool 11 is advanceable and retractable. However, the friction stir welding apparatus according to the present disclosure is not limited to this configuration. The friction stir welding apparatus need not include the stationary shoulder 12. A specific configuration of the inner corner presser 20 is also not particularly limited. The inner corner presser 20 may include other components in addition to the pressing roller 21, so long as the pressing roller 21 can come into contact with the inner corners 33a and 33b in a rollable manner.

Figure 8:
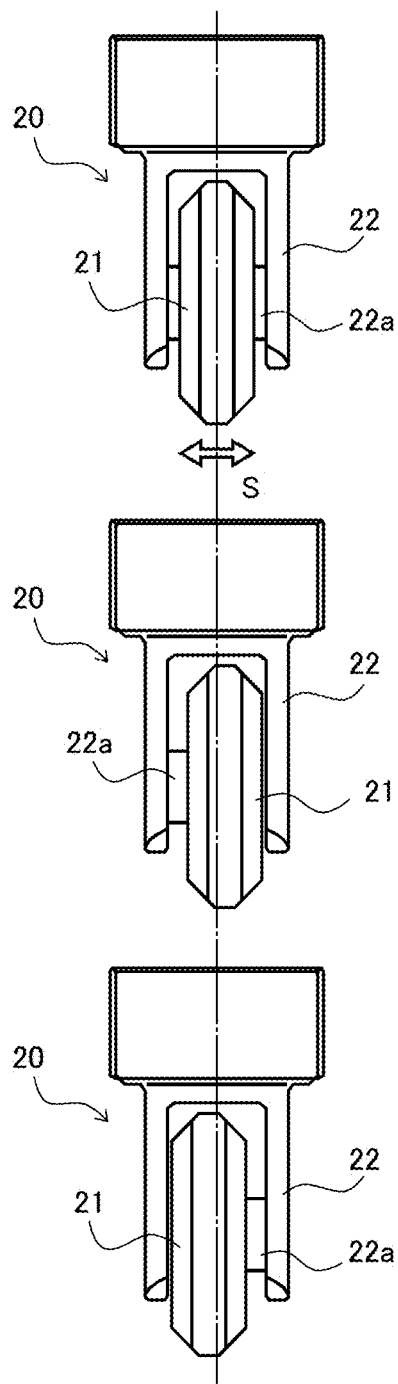
FIG. 8 is a comparative illustration of side views, showing another configuration example of the inner corner presser used in the friction stir welding apparatus of FIG. 1.

In the inner corner presser 20, the roller support 22, which supports the pressing roller 21 such that the pressing roller 21 is rollable, may support the pressing roller 21 such that the pressing roller 21 is movable with play in the direction of the rolling axis of the pressing roller 21. Specifically, for example, as shown in FIG. 8, in a case where the roller support 22 includes a roller support shaft 22a, by inserting the roller support shaft 22a in the bearing hole 21d (see FIG. 3A) of the pressing roller 21, the pressing roller 21 can be rollably supported by the roller support shaft 22a in such a manner that the shaft center of the roller support shaft 22a serves as a rolling axis. Here, if the length of the roller support shaft 22a is substantially the same as the thickness of the pressing roller 21, the pressing roller 21 does not move with play in the direction of the rolling axis.

On the other hand, in a case where the length of the roller support shaft 22a is greater than the thickness of the pressing roller 21 as shown in FIG. 8, the pressing roller 21 is movable, i.e., shiftable, in the direction in which the roller support shaft 22a extends, i.e., in the direction of the rolling axis, as indicated by a double-headed block arrow S in FIG. 8. The upper drawing in FIG. 8 shows the pressing roller 21 positioned at a reference position. The middle drawing in FIG. 8 shows a state where the pressing roller 21 has shifted from the reference position to the right side in the drawing. The lower drawing in FIG. 8 shows a state where the pressing roller 21 has shifted from the reference position to the left side in the drawing. In each of the upper, middle, and lower drawings, the reference position is indicated by a one-dot chain line, and these drawings are illustrated in such a manner that the reference positions in the respective drawings coincide with each other.

In a case where the pressing roller 21 is supported in the inner corner presser 20 such that the pressing roller 21 is movable with play so as to be shiftable in the direction in which the roller support shaft 22a extends (i.e., in the direction of the rolling axis), when the pressing roller 21 is brought into contact with either the inner corner 33a or the inner corner 33b, the tread 21a of the pressing roller 21 can be readily positioned on the surface of the fillet 34, or the position of the tread 21a can be readily aligned with the position at which the space corresponding to the fillet 34 is present. This make it possible to precisely form the shape of the fillet 34, and thereby the quality of the T-shaped construction 30 can be improved.

In the example shown in FIG. 5A to FIG. 6C, a side edge of the second workpiece 32, the side edge being butted against the first workpiece 31, includes the pre-formed fillet 34. However, the shape formed on the side edge of the second workpiece 32 is not limited to the shape of the fillet 34, i.e., not limited to a protrusion having a substantially triangular cross-sectional shape. For example, a protrusion having a rectangular cross-sectional shape or any other cross-sectional shape may be formed on the side edge.

Fields to which the friction stir welding apparatus 10A according to an exemplary embodiment 1 or the friction stir welding method according to an exemplary embodiment 1 is applied are not particularly limited. The friction stir welding apparatus 10A and the friction stir welding method according to an exemplary embodiment 1 are suitably and widely applicable to the manufacturing of a component including a T-shaped structure (T-joint). In particular, the friction stir welding apparatus and the friction stir welding method according to the present disclosure are suitably applicable to various aircraft components, for example, a structural component that is used in the manufacturing of an aircraft fuselage and that includes a T-shaped structure (T-joint).

For example, assume a case where in a skin/stringer structure that is used in, for example, an aircraft fuselage or aircraft blade, the stringer is upright on the skin (i.e., T-shaped structure), and inner corners formed by the skin and the stringer are coupled by friction stir welding. Here, it is conceivable to use a fixed-type pressing parts that presses the entire inner corner along the butted portion. In this case, however, the pressing parts would be elongated (i.e., increased in size) to have a length of greater than 10 m, and also, the weight of the pressing parts would be increased so as to achieve sufficient pressing force. In addition, such a fixed-type pressing parts needs to be properly fixed at its both ends to prevent positional deviation of the pressing parts.

In a case where a conventional movable pressing parts is used in order to avoid such increase in the length and the weight of the pressing parts, part of the softened material tends to adhere to the pressing surface of the pressing parts as previously described. Consequently, deformations, such as galling, occur on the surface of the inner corners. It is highly likely that deformations (flaws), such as galling, are not tolerated in various aircraft components. Even if they are tolerated, it is desirable that the deformations (flaws) be minimized.

According to the present disclosure, the inner corner that is not being friction-stirred is pressed by the pressing roller. Consequently, adhesion, to the pressing roller, of part of the workpieces softened due to the friction stirring is effectively suppressed or avoided, which makes it possible to effectively avoid the occurrence of deformations (flaws) or the like at the inner corners.

In addition, according to the present disclosure, one of the pair of inner corners is friction-stir-welded by one rotary tool, and the other inner corner is pressed by the pressing roller. Thus, unlike the friction stir welding apparatus disclosed in Patent Literature 1, it is not necessary to use two rotary tools in a manner to face them each other, or to use a large-sized very heavy fixed-type pressing parts. This makes it possible to effectively suppress, for example, an increase in the configuration complexity of the apparatus, an increase in the size of the apparatus, or an increase in cost.

As shown in FIG. 1, the friction stir welding apparatus 10A according to an exemplary embodiment 1 is configured such that the rotary tool 11 and the inner corner presser 20 are each mounted to the frame 14, and the frame 14 is moved by the frame mover 15 in the longitudinal direction of the workpieces 31 and 32 (or in the direction in which the butted portion 33 extends). However, the present disclosure is not limited to this configuration.

Figure 9:
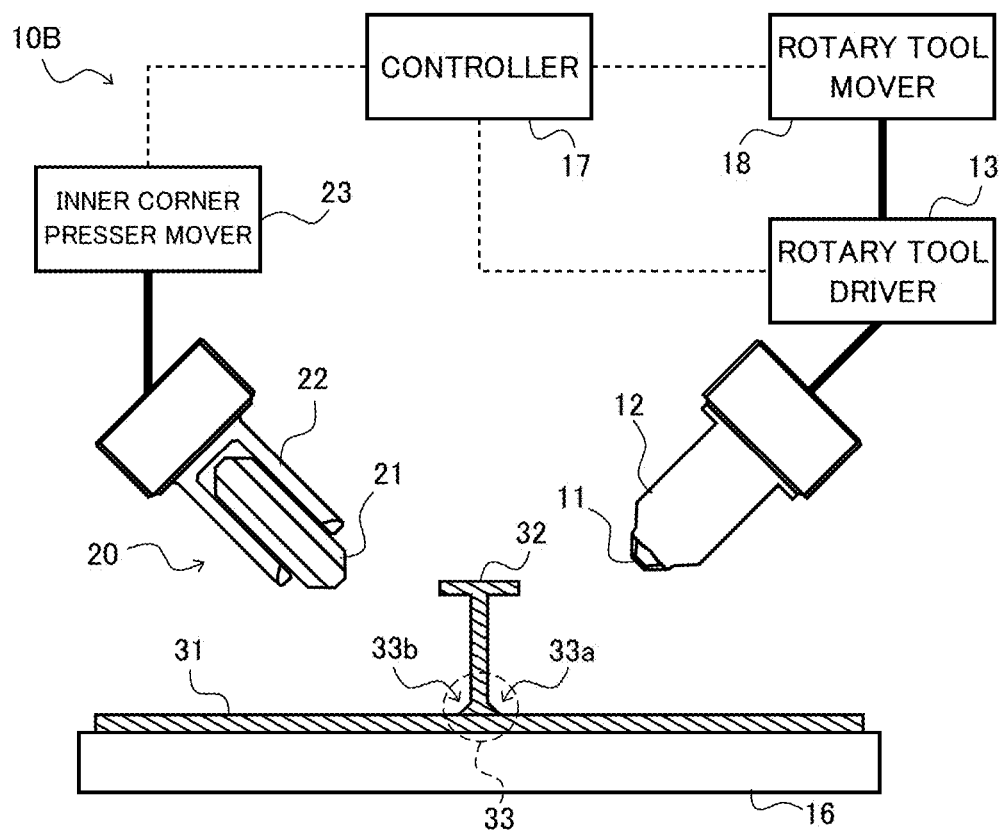
FIG. 9 is a schematic diagram showing a configuration example of a friction stir welding apparatus according to another exemplary embodiment 2 of the present disclosure.

For example, as shown in FIG. 9, a friction stir welding apparatus 10B according to an exemplary embodiment 2 does not include the frame 14. In the friction stir welding apparatus 10B, the rotary tool 11 is advanceable, retractable, and rotatable by the rotary tool driver 13, and also movable in the longitudinal direction by a rotary tool mover 18. The inner corner presser 20 is movable by an inner corner presser mover 23 in the direction in which the butted portion 33 extends. That is, in this exemplary embodiment 2, the rotary tool 11 (and the stationary shoulder 12) and the inner corner presser 20 are movable by the respective independent movers in the direction in which the butted portion 33 extends.

As described above, the friction stir welding apparatus according to the present disclosure may include movers that move the rotary tool 11 and the inner corner presser 20, respectively, in the direction in which the butted portion 33 extends. A specific configuration of the movers is not particularly limited. One example configuration may include a tool mounter, such as the frame 14, to which the rotary tool 11 and the inner corner presser 20 are mounted, and the tool mounter may be moved in the direction in which the butted portion 33 extends, as in the previous exemplary embodiment 1. Another example configuration may include the rotary tool mover 18, which moves the rotary tool 11, and the inner corner presser mover 23, which moves the inner corner presser 20, as in this exemplary embodiment 2.

Similar to the frame mover 15, each of the rotary tool mover 18 and the inner corner presser mover 23 may be controlled by the controller 17. The rotary tool mover 18 and the inner corner presser mover 23 may move the rotary tool 11 and the inner corner presser 20 independently. The rotary tool mover 18 and the inner corner presser mover 23 may move the rotary tool 11 and the inner corner presser 20 in synchronization with each other.

Each of the friction stir welding apparatus 10A according to the previous exemplary embodiment 1 and the friction stir welding apparatus 10B according to another exemplary embodiment 2 includes one rotary tool 11 and one inner corner presser 20, which face each other. On the other hand, a friction stir welding apparatus according to the other exemplary embodiment 3 includes two sets of the rotary tool and the inner corner presser. In each set, the rotary tool and the inner corner presser face each other.

In a friction stir welding apparatus 10C shown in FIG. 10A, a first rotary tool 11A is positioned at the forward side in the moving direction M (indicated by a block arrow). The first rotary tool 11A friction-stirs the first inner corner 33a of the second workpiece 32. A first pressing roller 21A facing the first rotary tool 11A, with the second workpiece 32 interposed between the first pressing roller 21A and the first rotary tool 11A, comes into contact with (is pressed against) the opposite second inner corner 33b of the second workpiece 32. A second rotary tool 11B is positioned backward of the first pressing roller 21A in the moving direction M. The second rotary tool 11B friction-stirs the second inner corner 33b. A second pressing roller 21B facing the second rotary tool 11B, with the second workpiece 32 interposed between the second pressing roller 21B and the second rotary tool 11B, comes into contact with (is pressed against) the opposite first inner corner 33a of the second workpiece 32.

Thus, at the first inner corner 33a of the second workpiece 32, the first rotary tool 11A is positioned at the forward side in the moving direction M, and the second pressing roller 21B is positioned rearward of the first rotary tool 11A. At the second inner corner 33b of the second workpiece 32, the first pressing roller 21A is positioned at the forward side in the moving direction M, and the second rotary tool 11B is positioned rearward of the first pressing roller 21A.

For the sake of convenience of illustration, for the inner corner pressers 20, FIG. 10A and FIG. 10B show only the pressing rollers 21A and 21B, which are the essential components of the inner corner pressers 20. Similar to FIG. 4A and FIG. 4B described in the previous exemplary embodiment 1, FIG. 10A and FIG. 10B are schematically illustrated as if the pressing rollers 21A and 21B and the rotary tools 11A and 11B are substantially perpendicularly in contact with the upright second workpiece 32.

The set of the first rotary tool 11A and the first pressing roller 21A (a first inner corner presser) is defined as a first tool set of the friction stir welding apparatus 10C, and the set of the second rotary tool 11B and the second pressing roller 21B (a second inner corner presser) is defined as a second tool set of the friction stir welding apparatus 10C. In this case, the first tool set is positioned at the forward side in the moving direction M, and the second tool set is positioned at the backward side in the moving direction M. Between these tool sets, the positions of the rotary tools 11A and 11B are staggered, and the positions of the pressing rollers 21A and 21B are staggered.

In each of the above-described friction stir welding apparatuses 10A and 10B, the number of tool sets including the rotary tool 11 and the pressing roller 21 (the inner corner presser 20) is one. Therefore, in a friction stir welding method using the friction stir welding apparatus 10A or 10B, as shown in FIG. 5C and FIG. 6A, one of the inner corners, i.e., the first inner corner 33a, is friction-stir-welded, and then after the positions of the rotary tool 11 and the pressing roller 21 are switched with each other, the other second inner corner 33b is friction-stir-welded. That is, in the friction stir welding method according to the previous exemplary embodiment 1 or embodiment 2, in order to perform the friction stir welding on the entire butted portion 33, the tool set needs to be moved twice along the direction in which the butted portion 33 extends.

On the other hand, as described above, the friction stir welding apparatus 10C according to the other exemplary embodiment 3 includes the two tool sets, and between these two tool sets, the positions of the rotary tools 11 are staggered, and the positions of the pressing rollers 21 are staggered. Therefore, both the inner corners 33a and 33b can be friction-stir-welded by the rotary tools 11A and 11B concurrently by moving the rotary tools 11A and 11B in the moving direction M. Consequently, by moving these tool sets once, the friction stir welding can be performed on the entire butted portion 33.

The pressing rollers 21A and 21B (the inner corner pressers) are arranged such that the pressing rollers 21A and 21B face the rotary tools 11A and 11B, respectively. That is, each of the pressing rollers 21A and 21B presses the inner corner that is not friction-stirred. Consequently, adhesion, to the pressing rollers 21A and 21B, of part of the material softened due to the friction stirring can be effectively suppressed or avoided, which makes it possible to effectively avoid the occurrence of deformations (flaws), such as galling, at the inner corners.

In the friction stir welding apparatus 10C of FIG. 10A, as shown in the left-side drawing of FIG. 4A, the pressing positions (indicated by dashed lines) of the pressing rollers 21A and 21B substantially coincide with positions that are located opposite to the plunging positions (indicated by one-dot chain lines) of the rotary tools 11A and 11B. However, as described in the previous exemplary embodiment 1, the pressing position of each pressing roller 21 is not thus limited. As shown in FIG. 10B, the pressing positions of the pressing rollers 21A and 21B may be, as seen from the plunging positions of the rotary tools 11A and 11B, deviated backward in the moving direction M (as indicated by Dr in the drawing). The range of the backward deviation Dr of the pressing positions of the pressing rollers 21A and 21B is not particularly limited, but may be the range described above in the previous exemplary embodiment 1. Of course, the deviation of each pressing position may be a slight forward deviation Df as shown in FIG. 4B.

Also for the friction stir welding apparatus 10C according to the other exemplary embodiment 3, in a case where a space corresponding to the fillet 34 is present between the tread of each of the pressing rollers 21A and 21B and a corresponding one of the inner corners 33a and 33b, the above-described linear object 42 may be disposed on each of the inner corners 33a and 33b as shown in FIG. 7A or FIG. 7C as a material corresponding to the volume of the space. Even in a case where the linear object 42 is disposed on either the inner corner 33a or the inner corner 33b (e.g., the first inner corner 33a) as shown in FIG. 7B, both the inner corners 33a and 33b can be friction-stir-welded concurrently.

[Friction Stir Welding Apparatus and Friction Stir Welding Method According to Present Disclosure]

A friction stir welding apparatus according to the present disclosure is a friction stir welding apparatus for use in friction stir welding performed on a butted portion where a second workpiece is butted against a first workpiece such that the second workpiece is upright on the first workpiece. The friction stir welding apparatus includes: a rotary tool that is plunged into one inner corner of a pair of inner corners that are positioned, at the butted portion, on both sides of the second workpiece, respectively; an inner corner presser that presses the other inner corner of the pair of inner corners; and a mover that moves the rotary tool and the inner corner presser along a direction in which the butted portion extends. The inner corner presser includes a pressing roller that presses the other inner corner while rolling in a state where the inner corner presser is being moved by the mover.

According to the above configuration, the rotary tool is plunged into one of the inner corners of the butted portion where the first workpiece and the second workpiece are butted together, and the rotary tool is moved along the butted portion to perform friction stir welding on the butted portion. At the time, the pressing roller presses the other inner corner while rolling. Consequently, adhesion, to the pressing roller, of part of the workpieces softened due to the friction stir welding is effectively suppressed or avoided, which makes it possible to effectively avoid deformations or the like at the inner corners.

In addition, according to the above configuration, one of the pair of inner corners is friction-stir-welded by one rotary tool, and the other inner corner is pressed by the pressing roller. Thus, it is not necessary to use two rotary tools in a manner to face them each other, or to use a large-sized very heavy fixed-type pressing parts. This makes it possible to effectively suppress, for example, an increase in the configuration complexity of the apparatus, an increase in the size of the apparatus, or an increase in cost.

The friction stir welding apparatus configured as described above may further include a stationary shoulder that is positioned at an outer periphery of the rotary tool, the stationary shoulder coming into contact with the one inner corner in a state where the rotary tool is plunged into the one inner corner.

In the friction stir welding apparatus with the above-described configuration, an outer circumferential surface of the pressing roller of the inner corner presser may be a tread that presses the other inner corner. In a state where the pressing roller is in contact with the other inner corner, the tread may be in contact with a fillet that is formed by joining the first workpiece and the second workpiece together, or a space corresponding to the fillet may be present between the tread and the other inner corner.

In the friction stir welding apparatus with the above-described configuration, the pressing roller may include a pair of inclined surfaces on both sides of the tread, and each of the inclined surfaces may extend from the tread toward an inner circumferential side of the pressing roller. At the butted portion, a front surface of the first workpiece may be a reference surface, and both surfaces of the upright second workpiece may be upright surfaces, each of which is upright on the reference surface. An inclination angle of each inclined surface may be set such that, in the state where the pressing roller is in contact with the other inner corner, the inclined surfaces are in contact with the reference surface and one of the upright surfaces, respectively.

In the friction stir welding apparatus with the above-described configuration, the inner corner presser may include a roller support that supports the pressing roller such that the pressing roller is rollable, and the roller support may support the pressing roller such that the pressing roller is movable with play in a direction of a rolling axis of the pressing roller.

In the friction stir welding apparatus with the above-described configuration, a pressing position of the pressing roller may be located at an opposite side of the second workpiece from a plunging position of the rotary tool, or the pressing position of the pressing roller may be, as seen from the plunging position of the rotary tool, deviated backward in a moving direction of the mover.

A friction stir welding method according to the present disclosure is a friction stir welding method for use in friction stir welding performed on a butted portion where a second workpiece is butted against a first workpiece such that the second workpiece is upright on the first workpiece. The friction stir welding method includes: plunging a rotary tool into one inner corner of a pair of inner corners that are positioned, at the butted portion, on both sides of the second workpiece, respectively, and moving the rotary tool along a direction in which the butted portion extends; and moving the rotary tool and an inner corner presser along the direction in which the butted portion extends, while pressing the other inner corner of the pair of inner corners by the inner corner presser. Pressing the other inner corner by the inner corner presser includes using a pressing roller as a pressing parts of the inner corner presser, the pressing parts pressing the other inner corner. The pressing roller presses the other inner corner while rolling in a state where the inner corner presser is being moved.

In the above-described friction stir welding method, a linear object may be disposed at least between the rotary tool and one of the inner corners, such that the linear object extends along the direction in which the butted portion extends. The friction stir welding method may comprise: softening the linear object by the rotary tool; and pushing, by the rotary tool, the softened linear object into the butted portion to form a fillet on the butted portion.

In the above-described friction stir welding method, a side edge of the second workpiece, the side edge being butted against the first workpiece, may include a pre-formed fillet.

The present disclosure is not limited to the embodiments described above, and various modifications can be made within the scope of the Claims. Embodiments obtained by suitably combining technical means that are disclosed in different embodiments and variations also fall within the technical scope of the present disclosure.

From the foregoing description, numerous modifications and other embodiments of the present disclosure are obvious to a person skilled in the art. Therefore, the foregoing description should be interpreted only as an example and is provided for the purpose of teaching the best mode for carrying out the present disclosure to a person skilled in the art. The structural and/or functional details may be substantially modified without departing from the spirit of the present disclosure.

INDUSTRIAL APPLICABILITY

The present disclosure is widely and suitably applicable to the field of manufacturing a construction including a T-shaped structure (T-joint). In particular, the present disclosure is suitably applicable to the field of manufacturing various aircraft components each including a T-shaped structure.

The invention claimed is:

1. A friction stir welding apparatus for use in friction stir welding performed on a butted portion where a second workpiece is butted against a first workpiece such that the second workpiece is upright on the first workpiece, the friction stir welding apparatus comprising:
 a rotary tool that is plunged into one inner corner of a pair of inner corners that are positioned, at the butted portion, on both sides of the second workpiece, respectively;
 an inner corner presser that presses the other inner corner of the pair of inner corners; and
 a mover that moves the rotary tool and the inner corner presser along a direction in which the butted portion extends, wherein
 the inner corner presser includes a pressing roller that presses the other inner corner while rolling in a state where the inner corner presser is being moved by the mover.

2. The friction stir welding apparatus according to claim 1, further comprising a stationary shoulder that is positioned at an outer periphery of the rotary tool, the stationary shoulder coming into contact with the one inner corner in a state where the rotary tool is plunged into the one inner corner.

3. The friction stir welding apparatus according to claim 1, wherein
 an outer circumferential surface of the pressing roller of the inner corner presser is a tread that presses the other inner corner, and
 in a state where the pressing roller is in contact with the other inner corner,
  the tread is in contact with a fillet that is formed by joining the first workpiece and the second workpiece together, or
  a space corresponding to the fillet is present between the tread and the other inner corner.

4. The friction stir welding apparatus according to claim 3, wherein
 the pressing roller includes a pair of inclined surfaces on both sides of the tread, and each of the inclined surfaces extends from the tread toward an inner circumferential side of the pressing roller,
 at the butted portion, a front surface of the first workpiece is a reference surface, and both surfaces of the upright second workpiece are upright surfaces, each of which is upright on the reference surface, and
 an inclination angle of each inclined surface is set such that, in the state where the pressing roller is in contact with the other inner corner, each of the inclined surfaces is in contact with the reference surface and one of the upright surfaces, respectively.

5. The friction stir welding apparatus according to claim 1, wherein the inner corner presser includes a roller support that supports the pressing roller such that the pressing roller rolls, and the roller support supports the pressing roller such that the pressing roller moves in a direction of a rolling axis of the pressing roller.

6. The friction stir welding apparatus according to claim 1, wherein a pressing position of the pressing roller is located at an opposite side of the second workpiece from a plunging position of the rotary tool, or the pressing position of the pressing roller is, as seen from the plunging position of the rotary tool, deviated backward in a moving direction of the mover.

7. A friction stir welding method for use in friction stir welding performed on a butted portion where a second workpiece is butted against a first workpiece such that the second workpiece is upright on the first workpiece, the friction stir welding method comprising:

plunging a rotary tool into one inner corner of a pair of inner corners that are positioned, at the butted portion, on both sides of the second workpiece, respectively;

moving the rotary tool and a pressing roller along the direction in which the butted portion extends, while pressing the other inner corner of the pair of inner corners by the pressing roller; wherein pressing the other inner corner by the pressing roller while rolling in a state where the pressing roller is being moved.

8. The friction stir welding method according to claim 7, wherein a linear object is disposed at least between the rotary tool and one of the inner corners, such that the linear object extends along the direction in which the butted portion extends, and the friction stir welding method comprises:

softening the linear object by the rotary tool; and pushing, by the rotary tool, the softened linear object into the butted portion to form a fillet on the butted portion.

9. The friction stir welding method according to claim 7, wherein a side edge of the second workpiece, the side edge being butted against the first workpiece, includes a preformed fillet.

* * * * *